(12) United States Patent
Jayaraman et al.

(10) Patent No.: US 11,719,459 B2
(45) Date of Patent: Aug. 8, 2023

(54) HVAC CONTROL SYSTEM AND METHOD

(71) Applicant: Carrier Corporation, Palm Beach Gardens, FL (US)

(72) Inventors: Dhiyanesh Bharathi Jayaraman, Bangalore (IN); Thanakarthik Kumar Karuppasamy, Bangalore (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 218 days.

(21) Appl. No.: 17/114,756

(22) Filed: Dec. 8, 2020

(65) Prior Publication Data

US 2021/0215375 A1 Jul. 15, 2021

(30) Foreign Application Priority Data

Jan. 14, 2020 (IN) .............................. 202011001722

(51) Int. Cl.
*F24F 11/65* (2018.01)
*F24F 11/46* (2018.01)
(Continued)

(52) U.S. Cl.
CPC .............. *F24F 11/65* (2018.01); *F24F 11/46* (2018.01); *F24F 11/64* (2018.01); *F24F 2110/12* (2018.01); *F24F 2120/10* (2018.01)

(58) Field of Classification Search
CPC .. F24F 11/65; F24F 11/46; F24F 11/64; F24F 2110/12; F24F 2120/10; F24F 11/54;
(Continued)

(56) References Cited

U.S. PATENT DOCUMENTS 9,982,903 B1 * 5/2018 Ridder .................... F24F 11/70
10,190,794 B1 * 1/2019 Zelczer .................... F24F 11/30
(Continued)

FOREIGN PATENT DOCUMENTS

EP 2857921 A1 8/2015
EP 3088972 A2 * 11/2016 .............. F24F 11/30

OTHER PUBLICATIONS

European Search Report for application EP 20215803.6, dated Jun. 28, 2021, 20 pages.
(Continued)

*Primary Examiner* — Frantz F Jules
*Assistant Examiner* — Matthew John Moscola
(74) *Attorney, Agent, or Firm* — Cantor Colburn LLP

(57) ABSTRACT

Aspects of the invention are directed towards a system and a method of controlling temperature of different zones inside premises based on determining an effective temperature set point. One or more dynamically sensed parameters are received from a plurality of sensors strategically placed within and outside of a building. One or more static parameters corresponding to building configurations and temperature thresholds from a memory unit are retrieved. A correlation engine determines the effective temperature set point for individual VAV controller associated with a particular pre-defined zone in the building by establishing a correlation between the one or more dynamically sensed parameters and static parameters corresponding to that zone. The effective temperature setpoint is transmitted to a VAV controller for associated zone.

9 Claims, 4 Drawing Sheets

(51) Int. Cl.
  *F24F 11/64* (2018.01)
  *F24F 120/10* (2018.01)
  *F24F 110/12* (2018.01)

(58) Field of Classification Search
  CPC ........ F24F 2110/10; F24F 11/30; F24F 11/80;
           F24F 11/89; F24F 11/56; F24F 11/61;
             F24F 11/88; G05D 23/1934; G05D
                                      23/1902
  See application file for complete search history.

(56) References Cited

U.S. PATENT DOCUMENTS

| | | |
|---|---|---|
| 11,359,828 B2 * | 6/2022 | Emmons ............... F24F 11/0001 |
| 2014/0039689 A1 * | 2/2014 | Honda .................... F24F 11/62 |
| | | 700/276 |
| 2018/0299153 A1 * | 10/2018 | Ajax .................... F24F 11/0001 |
| 2021/0018211 A1 * | 1/2021 | Ellis ......................... F24F 11/72 |
| 2021/0063039 A1 * | 3/2021 | Hallendy ................. F24F 11/64 |
| 2021/0071899 A1 * | 3/2021 | Bruno ...................... F24F 11/72 |
| 2021/0190349 A1 * | 6/2021 | Turney .................... F24F 11/56 |

OTHER PUBLICATIONS

Saookoor, Tamim, et al., "Feasability of Retrofitting Centralized HVAC Systems for Room-Level Zoning", 2012, IEEE, 10 pages.

* cited by examiner

HVAC CONTROL SYSTEM AND METHOD

CROSS-REFERENCE TO RELATED APPLICATIONS

This application claims priority to Indian Patent Application No. 202011001722, filed Jan. 14, 2020, the contents of which are incorporated by reference herein in their entirety.

TECHNICAL FIELD OF INVENTION

The present invention generally relates to heating, ventilation, and air conditioning (referred hereinafter as "HVAC") system. More particularly, the invention relates to a system and a method for controlling the temperature of various zones inside a premises with HVAC system.

BACKGROUND

Heating, ventilation, and air conditioning (HVAC) system is used in residential/commercial places for cooling or heating a building. In order to maintain cooling or heating in the building, the HVAC system uses an air handling unit (AHU) and one or more variable air volume (referred hereinafter as "VAV") units. Each of the VAV units may use diffusers to serve different zones/areas of the building. Particularly, each zone of the building may have a few diffusers connected with a VAV unit for maintaining a desired temperature in that zone. This helps in maintaining different cooling or heating temperature at the same time in various zones of the building. If a VAV unit is not able to maintain a desired temperature in a particular zone, then the temperature needs to be adjusted manually by increasing or decreasing the temperature of the system by the building management or the local thermostat. Moreover, temperature of any particular zone in the premises is independent of the occupancy of that particular zone.

VAVs are key component in the HVAC system because the entire HVAC system functions to achieve the demand for cooling/heating. Cooling/heating demand is transmitted from VAVs to AHU and in-turn from AHUs to the associated system, based on cooling/heating request. So even if there is no occupancy at a particular zone, VAVs consider an occupied temperature set point to achieve the demand. Especially, VAVs with large zone do not have effective temperature control with a single thermostat in each zone. On the other hand, during no or lesser number of occupants, energy is spent excessively to achieve the occupied temperature set point. In contrast, when occupancy level is at its maximum, comfort temperature is not achieved on time due to lack of prioritization based on occupancy.

In view of the afore-mentioned problems, there is a need of an efficient and effective system and a method for multi-load occupancy and sensor input as a correlation methodology to effectively control zone temperature to achieve energy savings and comfort enhancement in different zones of the premises.

SUMMARY

Various embodiments of the invention describe a system for determining an effective temperature set-point for a Variable Air Volume ("VAV") controller in HVAC. The system comprises a sensor interface module configured to receive one or more dynamically sensed parameters from a plurality of sensors strategically placed within and outside of a building. The system further comprises a standard reference module configured to retrieve one or more static parameters corresponding to building configurations and temperature thresholds from a memory unit. The system further comprises a correlation engine coupled with the sensor interface module and the standard reference module. The correlation engine is configured to dynamically determine the effective temperature set-point for individual VAV controller associated with a particular pre-defined zone in the building by establishing a correlation between the one or more dynamically sensed parameters and static parameters corresponding to that zone. The system also comprises one or more VAV controllers communicatively coupled with the correlation engine. Each VAV controller is configured to receive the respective effective temperature set-point value from the correlation engine via VAV interface and establish the temperature set point for associated zone based on the received value.

In an embodiment of the invention, the one or more dynamically sensed parameters comprise occupancy status, zone temperature and outside air temperature (OAT) measurements.

In a different embodiment of the invention, the one or more static parameters corresponding to building configurations comprise site location identifiers, standard building operating policies, standard asset configurations, number of zones in a building, number of sub-zones within a zone, sensor to zone mapping information, sensor to sub-zone mapping information and occupancy schedule.

In an embodiment of the invention, the one or more static parameters corresponding to temperature thresholds comprise Maximum temperature set-point reference for outside air temperature ($Tmax_{oat}$), Maximum and Minimum effective temperature set-points ($Tmax_{occ}$ and $Tmin_{occ}$) based on the occupancy schedule, Occupied and Un-occupied temperature set-points ($Tsp_{occ}$ and $Tsp_{unocc}$) based on user comfort temperature ranges and standard operating policies.

In another embodiment of the invention, the system further comprises an administration module configured to enable an administrator to specify the one or more static parameters via user interface and store them in the memory unit.

In yet another embodiment of the invention, the plurality of sensors comprise outside air temperature sensors, zone temperature sensors and occupancy detection sensors. Each outside air temperature sensor is configured to measure the outside air temperature of the building, each zone temperature sensor is configured to measure the air temperature for a zone in the building, and each occupancy detection sensor is configured to detect the occupancy status for a sub-zone.

In another embodiment of the invention, the correlation engine is further configured to determine the effective temperature set point ($Tsp_{eff}$) by establishing a correlation between the one or more dynamically sensed parameters and static parameters corresponding to a zone using the following formula:

$$Tsp_{eff} = Tmax_{occ} - \left[\left(\frac{n}{N} * 100\%\right) * (Tmax_{occ} - Tmin_{occ})\right]$$

Where, $Tsp_{eff}$ is the effective temperature set-point, $Tmax_{occ}$ is the Maximum temperature set-point during occupied schedule, $Tmin_{occ}$ is the Minimum temperature set-point during occupied schedule, n is the sum of occupied sub-zone in a zone, and N is total number of sub-zones in a zone.

In still another embodiment of the invention, the correlation engine is further configured to select the effective temperature set point ($Tsp_{eff}$) for each zone during occupancy schedule as either Unoccupied temperature set-point ($Tsp_{unocc}$) or Maximum temperature set-point ($Tmax_{occ}$) when there is no occupancy in sub-zones or zone temperature is lesser than Minimum temperature set-point ($Tmin_{occ}$). The choice of Unoccupied temperature set-point ($Tsp_{unocc}$) or Maximum temperature set-point ($Tmax_{occ}$) is configurable by the administrator.

In a different embodiment of the invention, the correlation engine is configured to determine the effective temperature set point for each zone ($Tsp_{eff}$) during occupancy schedule as Minimum temperature set-point ($Tmin_{occ}$) when outside air temperature is greater than Maximum outside air temperature ($Tmax_{oat}$).

Various embodiments of the invention describe a method for determining an effective temperature set-point for a Variable Air Volume ("VAV") controller in HVAC. The method comprises receiving, with a sensor interface module, one or more dynamically sensed parameters from a plurality of sensors strategically placed within and outside of a building. The method further comprises retrieving, with a standard reference module, one or more static parameters corresponding to building configurations and temperature thresholds from a memory unit. The method further dynamically determines, with a correlation engine, the effective temperature set-point for individual VAV controller associated with a particular pre-defined zone in the building by establishing a correlation between the one or more dynamically sensed parameters and static parameters corresponding to that zone. The method also comprises receiving, with a VAV controller, the respective effective temperature set-point value from the correlation engine via VAV interface and establishing the temperature set point for the associated zone based on the received value.

In an embodiment of the invention, the one or more dynamically sensed parameters comprise occupancy status, zone temperature, outside air temperature (OAT) measurements.

In a different embodiment of the invention, the one or more static parameters corresponding to building configurations comprise site location identifiers, standard building operating policies, standard asset configurations, number of zones in a building, number of sub-zones within a zone, sensor to zone mapping, sensor to sub-zone mapping information and occupancy schedule.

In yet another embodiment of the invention, the one or more static parameters corresponding to temperature thresholds comprise Maximum temperature set-point reference for outside air temperature ($Tmax_{oat}$), Maximum and Minimum effective temperature set-points ($Tmax_{occ}$ and $Tmin_{occ}$) based on the occupancy schedule, Occupied and Un-occupied temperature set-points ($Tsp_{occ}$ and $Tsp_{unocc}$) based on user comfort temperature ranges and standard operating policies.

In yet another embodiment of the invention, an administration module enables the administrator to specify the one or more static parameters via user interface and store them in the memory unit.

In another embodiment of the invention, the plurality of sensors comprise outside air temperature sensors, zone temperature sensors and occupancy detection sensors, and wherein each outside air temperature sensor is configured to measure the outside air temperature of the building, and wherein each zone temperature sensor is configured to measure the air temperature for a zone in the building, and wherein each occupancy detection sensor is configured to detect the occupancy status for a sub-zone.

In yet another embodiment of the invention, a correlation engine determines the effective temperature set point ($Tsp_{eff}$) by establishing a correlation between the one or more dynamically sensed parameters and static parameters corresponding to a zone using the following formula:

$$Tsp_{eff} = Tmax_{occ} - \left[\left(\frac{n}{N} * 100\%\right) * (Tmax_{occ} - Tmin_{occ})\right]$$

Where, $Tsp_{eff}$ is the effective temperature set-point, $Tmax_{occ}$ is the Maximum temperature set-point during occupied schedule, $Tmin_{occ}$ is the Minimum temperature set-point during occupied schedule, n is sum of occupied sub-zone in a zone, and N is total number of sub-zone in a zone.

In another embodiment of the invention, the correlation engine selects the effective temperature set point ($Tsp_{eff}$) for each zone during occupancy schedule as either Unoccupied temperature set-point ($Tsp_{unocc}$) or Maximum temperature set-point ($Tmax_{occ}$) when there is no occupancy in sub-zones or zone temperature is lesser than Minimum temperature set-point ($Tmin_{occ}$), and wherein the choice of Unoccupied temperature set-point ($Tsp_{unocc}$) or Maximum temperature set-point ($Tmax_{occ}$) is configurable by the administrator.

In an embodiment of the invention, the correlation engine determines the effective temperature set point for each zone ($Tsp_{eff}$) during occupancy schedule as Minimum temperature set-point ($Tmin_{occ}$) when outside air temperature is greater than Maximum outside air temperature ($Tmax_{oat}$).

In another different embodiment of the invention the correlation engine disregards the value of determined effective temperature set-point ($Tsp_{eff}$) when measured outside air temperature ($T_{oat}$) is more than the Maximum Temperature set-point reference ($Tmax_{oat}$).

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

Corresponding reference numerals indicate corresponding parts throughout the drawings.

DETAILED DESCRIPTION

Figure 1:
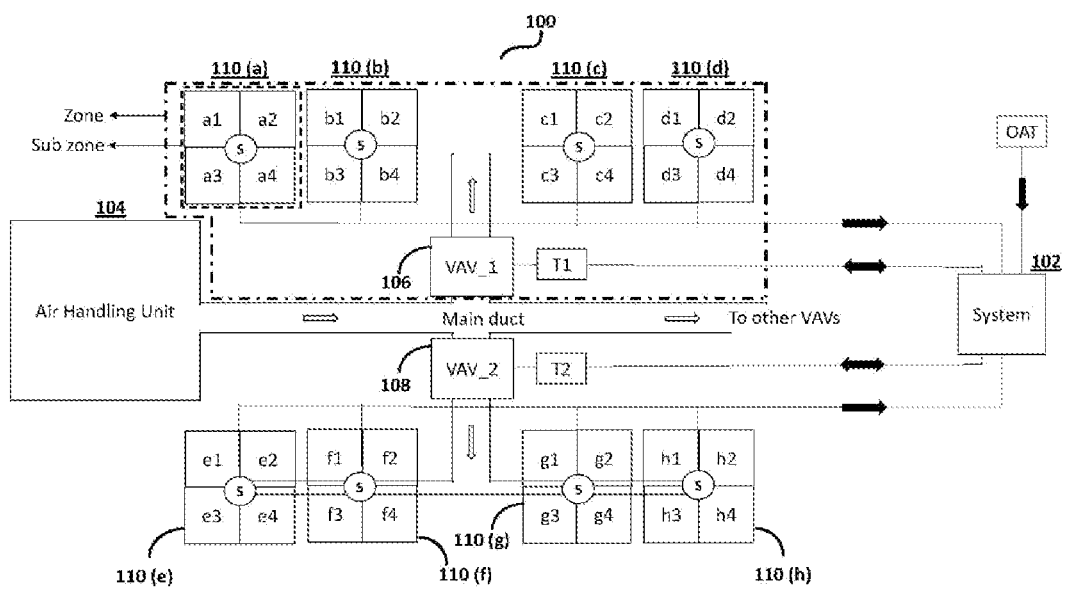
FIG. 1 depicts an exemplary system architecture according to an exemplary embodiment of the invention.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Described herein is a technology with a system and a method for establishing an effective temperature set point for each zone of a plurality of zones. Temperature of each zone may be controlled in the HVAC system. The HVAC system comprises a plurality of VAV units. Each zone may be associated with at least one VAV unit. Also, there may be a number of zones associated with one VAV unit. The HVAC system further includes an AHU unit which control the air flow in the plurality of VAVs. The VAVs further controls the air flow in associated zones of the VAVs. The AHU is also associated with a heater/cooler system to receive the heating/cooling based on the requirements of different zones.

Each zone of the premises may be associated with a number of sensors. A control system is described comprising a sensor interface module for receiving one or more dynamically sensed parameters from a plurality of sensors strategically placed within and outside of a building. For example, a sensor may be used to determine zone temperature and report the same to a heating/cooling system. The sensor for determining the zone temperature may be referred as "zone temperature sensor." Similarly, a different sensor may be used to determine the parameters from outside the building. The system further comprises a standard interface module to retrieve one or more static parameters corresponding to building configurations and temperature thresholds from a memory unit. The system further comprises a correlation engine coupled with the sensor interface module and the standard reference module. The correlation engine is configured to dynamically determine the effective temperature set-point for individual VAV controller associated with a particular pre-defined zone in the building by establishing a correlation between the one or more dynamically sensed parameters and static parameters corresponding to that zone. The system also comprises one or more VAV controllers communicatively coupled with the correlation engine, wherein each VAV controller is configured to receive the respective effective temperature set-point value from the correlation engine via VAV interface and to establish the temperature set point for associated zone based on the received value.

As described herein, the one or more dynamically sensed parameters may include occupancy status, zone temperature and outside air temperature (OAT) measurements. The occupancy status may be determined in terms of number of persons, number of objects, and the like in each zone. The sensor to detect the occupancy status may be a passive infrared sensor or ultrasonic sensor, or a camera and the like which determine the number of active zones based on persons/objects in each zone. The occupancy status determined by the sensor (herein after "occupancy sensor") is transmitted to the system via the sensor interface module. There may be a plurality of cameras to determine the occupancy status in each zone. The system also receives the information of OAT from the environment. The OAT may be determined relative to the plurality of zones inside the premises. The OAT may be referred to environment temperature in a locality such as city, street etc. The OAT may also be determined from the network using a weather feed.

In an embodiment of the invention, there may be a plurality of sensors in each zone that may determine dynamically sensed parameters. Each of the sensor may comprise, but is not limited to, a transmitter, a receiver, a sensing unit, a memory and/or a processor. The different sensors may be connected to the heating/cooling system via a wired connection or a wireless connection. The wired connection may comprise, but not limited to, telephone networks, cable, fiber-optic communication, and waveguide communication. The wireless connection may be a cellular communication (such as Global System for Mobile (GSM) network, a Long-Term Evolution (LTE) network, a code-division multiple access (CDMA) network, a narrow-band internet of thing (NB-IoT) technique or category M1 technique)), a Wi-Fi communication, a ZigBee communication or any such network or communication that is known in the art.

As described herein, the plurality of sensors comprise outside air temperature sensors, zone temperature sensors and occupancy detection sensors. Each of the outside air temperature sensor may be configured to measure the outside air temperature of the building, and each zone temperature sensor may be configured to measure the air temperature for a zone in the building. Further, each occupancy detection sensor may be configured to detect the occupancy status for a sub-zone.

As described herein, the system comprises the standard reference module to receive static parameters which relates to building configurations and temperature thresholds. The static parameters may comprise site location identifiers, standard building operating policies, standard asset configurations, number of zones in a building, number of sub-zones within a zone, sensor to zone mapping information, sensor to sub-zone mapping information and occupancy schedule and the like. The static parameters may be stored in a memory unit placed inside the system. Particularly, the static parameters may correspond to temperature thresholds for example, Maximum temperature set-point reference for outside air temperature ($Tmax_{oat}$), Maximum and Minimum effective temperature set-points ($Tmax_{occ}$ and $Tmin_{occ}$) based on the occupancy schedule, Occupied and Un-occupied temperature set-points ($Tsp_{occ}$ and $Tsp_{unocc}$) based on user comfort temperature ranges and standard operating policies and the like. It is to be noted that different static parameters may be configured by an administrator using a user interface.

The system may be part of a building automation system (BAS) in large premises such as buildings, hospitals, museums and the like.

Turning now to Figures, FIG. 1 illustrates entire premises 100 where the dynamically sensed parameters such as temperature is required to be controlled. The parameters may be individually controlled in different zones of a premises such as building. The premises includes a system 102 for receiving inputs from different zones and other external inputs. The system 102 determines an effective temperature set point for each of the different zones. The premises 100 comprises different zones, for example, FIG. 1 depicts two different zones, a first zone including subzones 110a, 110b, 110c, and 110d. Similarly, there exists a second zone comprising subzones 110e, 110f, 110g, and 110h. Air flow in each of the zone may be controlled using VAV associated with that zone. For example, the first zone is controlled by VAV 106 and the second zone is controlled by VAV 108. It is known that a VAV may control air flow in one zone or multiple zones. The air flow control of each zone by a single VAV is also within the scope of the invention. Each of the zones comprises sensors to determine dynamically sensed parameters from each zone. The dynamically sensed parameters may be occupancy status indicating occupants such as people, objects and the like. Each of the zone also comprises a zone temperature sensor to determine temperature in each zone. Both the sensors are designated as S in each subzone. The VAVs are associated with thermostats T1 and T2 to control the temperature of each zone. The number of zones, VAV, AHU, and the thermostats described in FIG. 1 are exemplary. The invention may be performed using different combinations of these components which is within the scope of the invention.

The system 102 receives the one or more sensed parameters from the plurality of sensors in each zone as well as sensors from outside the premises or building. The system 102 also receives static parameters via a network corresponding to building configurations comprise site location identifiers, standard building operating policies, standard asset configurations, number of zones in a building, number of sub-zones within a zone, sensor to zone mapping information, sensor to sub-zone mapping information and occupancy schedule among others. The system 102 may process the received information and may determine the effective temperature set point for each zone using a correlation engine. The system 102 may transmit the temperature set points for each zone to the thermostat associated with the zones. For example, the system 102 may transmit the temperature set points for different subzones (110 (a-d)) to thermostat T1 and subsequently to VAV 106. Similarly, the temperature set points for subzones (110 (e-h)) would be transmitted by system 102 to the thermostat T2 and subsequently to VAV 108.

An AHU unit 104 is also associated with the premises 100. The AHU unit 104 supplies required airflow to each of the VAVs in the system. The thermostats T1 and T2 are configured to control the temperature in each of the associated zones and subzones via the respective VAV. As an example, the temperature set points for first, second, third, and fourth subzones (110 (a-d)) are received by the thermostat T1. The thermostat T1 provide signals to the VAV 106 for controlling the temperature of respective subzones (110 (e-h)).

The VAV 106 is operable to control the temperature of each through appropriate opening of ducts to the zones. It is known that a VAV provide temperature control for each zone through action of compressor, fan, and opening of ducts for each zone. The VAV system disclosed herein is a multiple-zone VAV system which controls the temperature of multiple zones from single VAV.

Similarly, the temperature set points determined by the correlation engine for subzones (110(e-h)) are transmitted to thermostat T2 which further controls the temperature of the subzones (110(e-h)) as discussed with respect to thermostat T1 above.

In an exemplary embodiment of the invention, the temperature set point or effective temperature set point for each zone is determined by the system 102 as per the formula:

$$Tsp_{\mathit{eff}} = T\max_{occ} - \left[\left(\frac{n}{N} * 100\%\right) * (T\max_{occ} - T\min_{occ})\right]$$

Where, $Tsp_{\mathit{eff}}$ is the effective temperature set-point, $T\max_{occ}$ is the Maximum temperature set-point during occupied schedule, $T\min_{occ}$ is the Minimum temperature set-point during occupied schedule, n is the sum of occupied sub-zone in a zone, and N is total number of sub-zone in a zone.

In an exemplary embodiment, calculation of effective temperature setpoint may at different occupancy status is detailed in Table 1 below:

TABLE 1

| Occupancy Status (%) for each zone | Effective Set point for each zone |
|---|---|
| 0% or [Ts < (TMINocc − 1)] | TSPeff = (TSPunocc) or (TMAXocc) |
| 25% | TSPeff = TMAXocc − [ 25% x (TMAXocc − TMINocc) ] |
| 50% | TSPeff = TMAXocc − [ 50% x (TMAXocc − TMINocc) ] |
| 75% | TSPeff = TMAXocc − [ 75% x (TMAXocc − TMINocc) ] |
| 100% or [OAT > OATmax] | TSPeff = TMAXocc − [ 100% x (TMAXocc − TMINocc) ] |

The different legends in Table 1 are denoted by:

TSPeff—Effective Temperature Setpoint

TSPunocc—Unoccupied Temperature Setpoint

TSPocc—Occupied Temperature Setpoint

Ts—Space temperature (Zone)

TMAXocc—Maximum Temperature Set point during occupied schedule

TMINocc—Minimum Temperature Setpoint during occupied schedule

OAT—Outside Air Temperature

OATmax—Maximum Temperature Setpoint reference for outside air temperature

When a building policy schedule is enabled, system 102 calculates occupied set point between the available lower and higher temperature set point range of the system to define the effective set point. It is to be noted that an occupied schedule may be the time for which persons are expected to work in the office. For example, if typical office timing is 8:30 AM to 6 PM, then operator might run the HVAC system from 8 AM till 6 PM. In this example, the occupied schedule is 8 AM-6 PM.

The system evaluates and determines the effective temperature set point. As an example, when the occupancy of a particular zone is 0%, i.e. if the zone is empty or if the temperature of the zone is less than the Minimum Temperature Set point during occupied schedule, the system 102 evaluates the temperature set point as (TSPunocc) or (TMAXocc) i.e. Unoccupied Temperature Set point or Maximum Temperature Set point during occupied schedule.

This means that when the zone is empty the temperature set point may be determined as a maximum occupied temperature set point.

As another example, if the occupancy of a particular zone is 25%, the system evaluates the temperature set point as TSPeff=TMAXocc−[25%×(TMAXocc−TMINocc)]. In other words, the temperature set point is directly proportional to difference between the Maximum Temperature Set point during occupied schedule and Minimum Temperature Set point during occupied schedule of occupancy.

Similarly, in case of occupancy of the particular zone is 50% and 75%, the temperature set point is directly proportional to difference between the Maximum Temperature Set point during occupied schedule and Minimum Temperature Set point during occupied schedule of respective occupancy.

In a special case, if the outside air temperature is greater than predefined threshold (OATmax) or Maximum Temperature Set point reference for outside air temperature, the system will set the effective temperature set point to TMINocc i.e. Minimum Temperature Set point during occupied schedule. This is to ensure that system does not cause discomfort during higher ambient temperature ranges. In other words, the effective temperature set point determined by the correlation engine is disregarded when measured outside air temperature ($T_{oat}$) is more than the Maximum Temperature set-point reference ($Tmax_{oat}$).

Table 2 below describes an illustrative example showing different temperature set points during occupied and unoccupied schedule:

TABLE 2

| | |
|---|---|
| TSPunocc - Unoccupied Temperature Set point | 27° Celsius |
| TSPocc - Occupied Temperature Set point | Cooling set point 22° Celsius −25° Celsius |
| TMAXocc - Maximum Temperature Set point during occupied schedule | 25° Celsius |
| TMINocc - Minimum Temperature Set point during occupied schedule | 22° Celsius |
| OATmax | 30° Celsius |

Based on the temperature set point as discussed above, the temperature set points at different occupancy would be as illustrated in Table 3 below:

TABLE 3

| Occupancy (%) | Temperature set point |
|---|---|
| 0% | 27° Celsius |
| 25% | 24.25° Celsius |
| 50% | 23.5° Celsius |
| 75% | 22.75° Celsius |
| 100% | 22° Celsius |

Based on the illustrations and description above, the invention has the technical advantage of energy or power conservation based on the occupancy level of different zones in the premises. Further, the invention provides an effective temperature control to the comfort of the occupant. Moreover, the invention describes a cost effective solution to the problem of effective temperature control.

Figure 2:
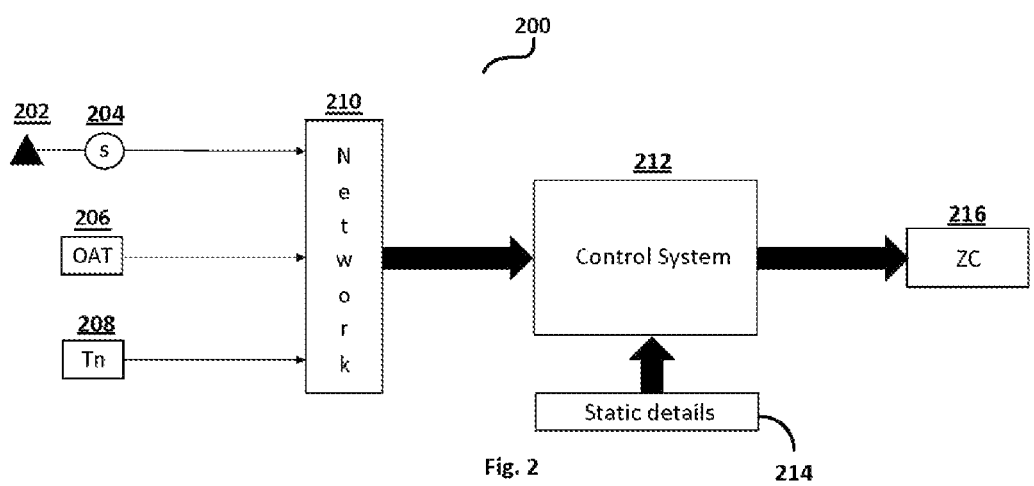
FIG. 2 depicts block diagram of different components showing communication of information according to a system in an exemplary embodiment of the invention.

FIG. 2 depicts block diagram illustrating different components in the premises/building 200 similar to as described in FIG. 1. A control system 212 receives dynamically sensed parameters from a plurality of sensors (204, 204, 206, 208) regarding occupancy level of a zone including persons/objects 202. The dynamically sensed parameters may comprise outside air temperature (OAT), zone temperature 208 (from thermostat (Tn)), occupancy status and the other such parameters. The dynamically sensed parameters are received by the control system 212 via network 210. The details of the type of networks which may be used are already discussed above. The control system 212 also receives static parameters which may be received via a network or may also be input manually by an authorized operator to enhance the comfort of the occupants in each zone. The details of the static parameters are already discussed above. The control system 212 determines the effective temperature set point or temperature set point for each zone using a correlation engine 216. It may be noted that the correlation engine 216 may be integrated with the control system 212 or may be part of a VAV. It is to be noted that the control system 212 may be a Building automation system (BAS) standalone software or with Controllers combined or standalone controllers with IO modules or any Gateways with integration modules to receive information from all of the sensors and static parameters to process the logic effectively and to send the output seamlessly for execution. The correlation engine 216 dynamically determine the effective temperature set-point for individual VAV controller associated with a particular pre-defined zone in the building by establishing a correlation between the one or more dynamically sensed parameters and static parameters corresponding to that zone. Each of the VAV controller receives the effective temperature set point determined by the correlation engine 216 and subsequently controls the temperature of the associated zone or subzones. It may be noted that the correlation engine is configured to determine the effective set point for either each or subzones inside each zone as discussed above.

Figure 3:
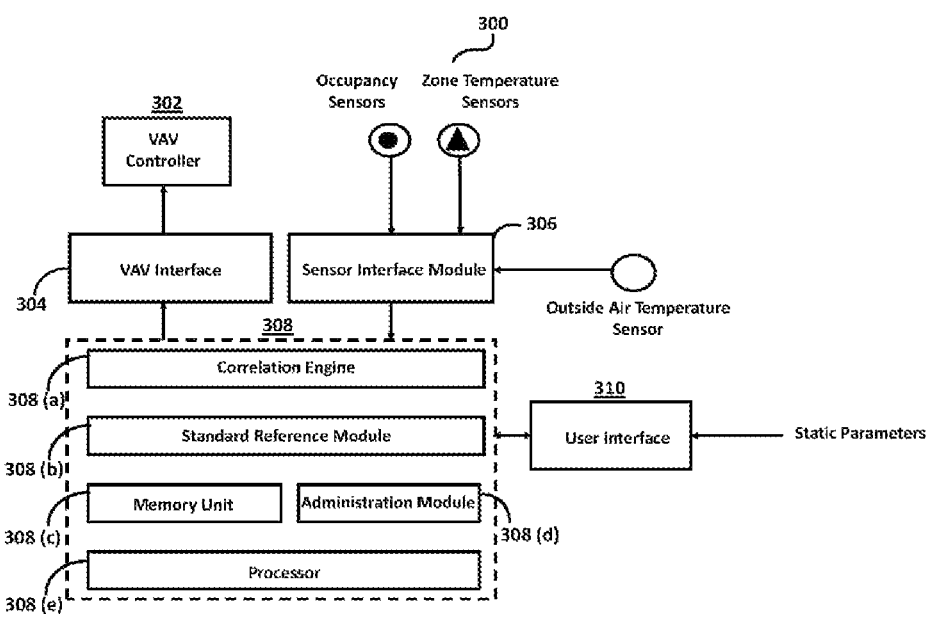
FIG. 3 depicts block diagram of different components of a system associated with the premises according to an exemplary embodiment of the invention.

FIG. 3 depicts block diagram of different components of an exemplary system 300. The system 300 is similar to system 102 described in FIG. 1. The system 300 comprises a VAV controller 302 associated with a VAV interface 304 and configured to control the temperature based on the effective temperature set point determined by a correlation engine 308a. The VAV controller 302 is communicably coupled with a control unit/system 308. The system 300 comprises a sensor interface module 306 configured to receive or fetch sensed parameters from a plurality of sensors such as occupancy sensors, zone temperature sensor, outside air temperature, and the like. The system comprises the control system 308. The control system comprises a correlation engine 308a. The correlation engine 308a receives the dynamically sensed parameters from the sensor interface module 306. Also, the correlation engine 308a is configured to receive static parameters or static details from a standard reference module 308b. The static parameters may also be stored in a memory unit 308c and received by the standard reference module 308b. The correlation engine 308a correlates between the one or more dynamically sensed parameters and static parameters corresponding to a particular zone and determine an effective temperature set point for that particular zone or subzone. The control unit 308 is associated with a processor 308e to execute different operations performed by the control unit 308. The control unit 308 further comprises an administration module 308d configured to enable an administrator to specify the one or more static parameters via user interface 310 and store them in the memory unit 308c.

The different units described herein are exemplary. The invention may be performed using one or more units. For example, the tasks executed by correlation engine 308a, the standard reference module 308b, and the memory unit 308c, the administration module 308d, and the processor 308e may be performed by a single unit. Alternatively, a greater number of units as described herein may be used to perform the invention.

Figure 4:
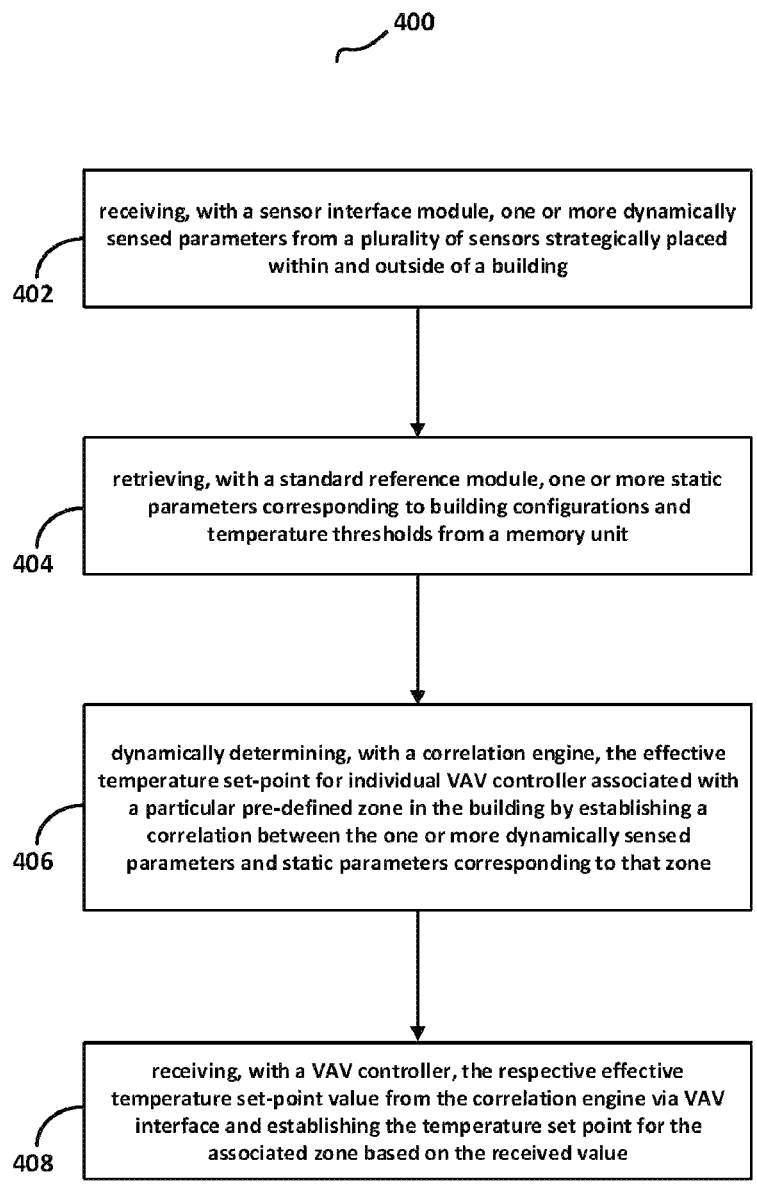
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method being performed to determine the effective temperature set point for each zone. The method starts at 402 receiving, with a sensor interface module, one or more dynamically sensed parameters from a plurality of sensors strategically placed within and outside of a building as described with respect to FIG. 1 above.

At step 404, a standard reference module retrieves one or more static parameters corresponding to building configurations and temperature thresholds from a memory unit.

At step 406, the effective temperature set-point is determined for individual VAV controller associated with a particular pre-defined zone in the building by establishing a correlation between the one or more dynamically sensed parameters and static parameters corresponding to that zone. This has been discussed in greater details in FIG. 1 above.

At step 408, the respective effective temperature set-point value is received by the VAV controller from the correlation engine via VAV interface and the temperature set point for the associated zone is established based on the received value. This has been discussed in greater details in FIG. 1 above.

The present invention is applicable in various industries/fields such as, but is not limited to, banking industry, hospitality industry, housing industry, building/construction industry, offices, universities, hospitals, colleges, homes and any such industry/field that is well known in the art and where the HVAC systems are used.

The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a control system. A computer readable medium comprises one or more processors and a memory coupled to the one or more processors, the memory stores instructions executed by the one or more processors. The one or more processors are configured to receive one or more dynamically sensed parameters from a plurality of sensors strategically placed within and outside of a building. The one or more processors are further configured to retrieve one or more static parameters corresponding to building configurations and temperature thresholds from a memory unit. The one or more processors are configured to determine with a correlation engine, the effective temperature set-point for individual VAV controller associated with a particular pre-defined zone in the building by establishing a correlation between the one or more dynamically sensed parameters and static parameters corresponding to that zone. The effective temperature set point is transmitted by one or more processors to respective VAV.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "controller" can refer to substantially any processor or computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for determining an effective temperature set-point for one or more Variable Air Volume ("VAV") controllers in a heating, ventilation, and air conditioning (HVAC), the method comprising:
   receiving one or more dynamically sensed parameters from a plurality of sensors strategically placed within and outside of a building;
   retrieving one or more static parameters corresponding to building configurations and temperature thresholds from a memory unit;
   dynamically determining the effective temperature set-point for an individual VAV controller associated with a particular pre-defined zone in the building by establishing a correlation between the one or more dynamically sensed parameters and static parameters corresponding to that zone; and
   receiving, with the VAV controller, the respective effective temperature set-point value and establishing the temperature set point for the associated zone based on the received value;
   wherein the one or more static parameters includes the total number of sub-zones in the pre-defined zone, the one or more dynamically sensed parameters includes the sum of occupied sub-zones in the pre-defined zone, and the effective temperature set-point is based on the proportion of sub-zones in the pre-defined zone which are occupied to the total number of sub-zones in the pre-defined zone.

2. The method according to claim 1, wherein the one or more dynamically sensed parameters comprise an occupancy status, a zone temperature, outside air temperature (OAT) measurements.

3. The method according to claim 1, wherein the one or more static parameters corresponding to building configurations comprise site location identifiers, a number of zones in the building, a number of the sub-zones within the zone, a sensor to zone mapping, a sensor to sub-zone mapping information and an occupancy schedule.

4. The method according to claim 1, wherein the one or more static parameters corresponding to temperature thresholds comprise Maximum temperature set-point reference for outside air temperature ($Tmax_{oac}$), Maximum and Minimum effective temperature set-points ($Tmax_{occ}$ and $Tmin_{occ}$) based on an occupancy schedule, Occupied and Un-occupied temperature set-points ($Tsp_{occ}$ and $Tsp_{unocc}$) based on user comfort temperature ranges.

5. The method according to claim 1, wherein the plurality of sensors comprise outside air temperature sensors, zone temperature sensors and occupancy detection sensors, and wherein each outside air temperature sensor is configured to measure the outside air temperature of the building, and wherein each zone temperature sensor is configured to measure the air temperature for the zone in the building, and wherein each occupancy detection sensor is configured to detect the occupancy status for a sub-zone.

6. The method according to claim 1 wherein determining the effective temperature set point ($Tsp_{eff}$) is performed by establishing a correlation between the one or more dynamically sensed parameters and static parameters corresponding to a zone using the following formula:

$$Tsp_{eff} = Tmax_{occ} - \left[\left(\frac{n}{N} * 100\%\right) * (Tmax_{occ} - Tmin_{occ})\right]$$

Where, $Tsp_{eff}$ is the effective temperature set-point, $Tmax_{occ}$ is the Maximum temperature set-point during occupied schedule, $Tmin_{occ}$ is the Minimum temperature set-point during occupied schedule, n is sum of occupied sub-zone in a zone, and N is total number of sub-zone in a zone.

7. The method according to claim 6, further comprising, selecting the effective temperature set point ($Tsp_{eff}$) for each zone during occupancy schedule as either Unoccupied temperature set-point ($Tsp_{unocc}$) or Maximum temperature set-point ($Tmax_{occ}$) when there is no occupancy in sub-zones or zone temperature is lesser than Minimum temperature set-point ($Tmin_{occ}$), and wherein the choice of Unoccupied temperature set-point ($Tsp_{unocc}$) or Maximum temperature set-point ($Tmax_{occ}$) is configurable.

8. The method according to claim 6, further comprising, determining the effective temperature set point for each zone ($Tsp_{eff}$) during occupancy schedule as Minimum temperature set-point ($Tmin_{occ}$) when outside air temperature is greater than Maximum outside air temperature ($Tmax_{oat}$).

9. The method according to claim 6, further comprising, disregarding the value of determined effective temperature set-point ($Tsp_{eff}$) when measured outside air temperature ($T_{oat}$) is more than the Maximum Temperature set-point reference ($Tmax_{oat}$).

* * * * *